July 17, 1928.
C. W. WEISS
1,677,311
UNIVERSAL JOINT
Filed Feb. 18, 1927
2 Sheets-Sheet 2
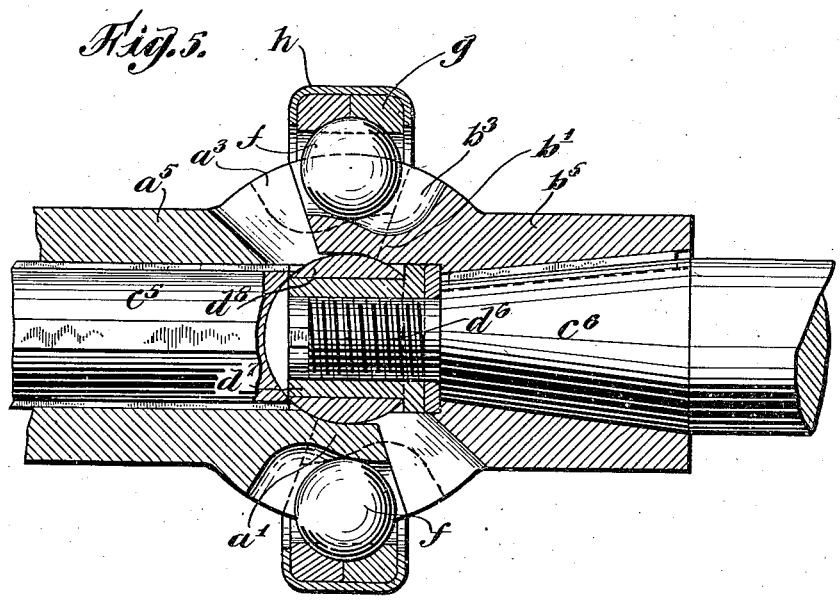
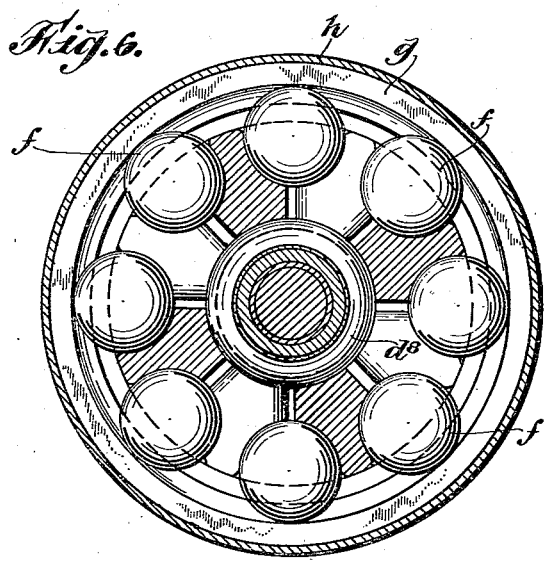
INVENTOR
Carl W. Weiss
BY
Redding, Greeley, O'Shea & Campbell
ATTORNEYS Patented July 17, 1928.

1,677,311

UNITED STATES PATENT OFFICE.

CARL W. WEISS, OF BROOKLYN, NEW YORK.

UNIVERSAL JOINT.

Application filed February 18, 1927. Serial No. 169,151.

This invention relates to universal joints of the character of that shown in Letters Patent of the United States No. 1,522,351, dated January 6, 1925, in which the two members capable of relative angular displacement have the proximate faces of their co-acting portions formed with non-concentric grooves with their longitudinal axes intersecting at an angle, and with a ball or other relatively movable body received partly in each of such grooves and through which force is transmitted from one co-acting portion to the other. In the form of joint shown in said Letters Patent, the two members of the joint can be displaced relatively in an axial direction unless a shell or housing is provided, the balls or movable bodies themselves offering no resistance to the separation of the members in an axial direction but passing out of the open ends of the intersecting grooves when the two portions are separated.

The object of the present invention is to provide for such construction of a joint having the characteristics above mentioned that the balls or relatively movable bodies shall themselves prevent the separation of the members, rendering unnecessary the provision of a shell or housing for this purpose. In accordance with the invention there is provided a circular abutment which restrains the balls or movable bodies from movement in a radial direction with respect to the axis of the joint so that the balls or movable bodies, through their engagement with the non-concentric grooves, prevent the separation of the members of the joint. Such circular abutment is internal or external with respect to the orbit of the balls, according to the inclination of the non-concentric grooves in the proximate faces of the co-acting portions of the two members.

The invention will be more fully explained hereinafter with reference to the accompanying drawings, in which:

Figures 5 and 6 are views respectively similar to Figures 1 and 2, but showing an embodiment of the invention in a joint in which the intersecting grooves are inclined outwardly or away from the axis of the joint and the circular abutment is external to the orbit of the balls.

Figure 1:
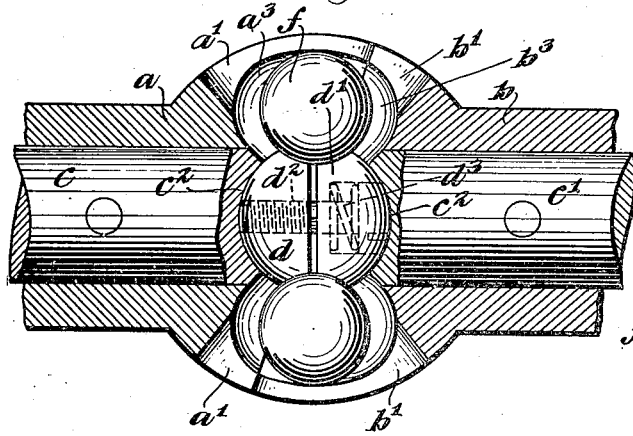
Figure 1 is a view in longitudinal, sectional elevation of a joint which embodies one form of the present invention.
Figure 2:
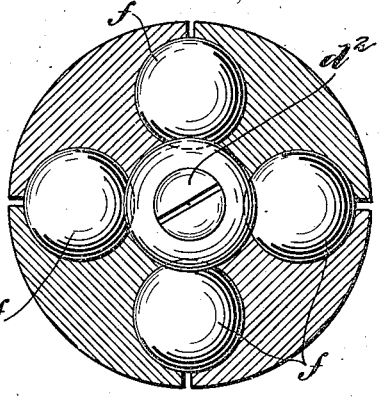
Figure 2 is a view of the same in transverse sectional elevation, the non-concentric grooves in this instance being inclined inwardly toward the axis of the joint.

As to number and arrangement of co-acting parts of each member, driving and driven, the construction of the improved joint will be governed by place and conditions of use. As shown in Figures 1 and 2 of the drawings, the driving member $a$ is formed with two finger-like portions or projections $a'$ with radial faces and designed to co-act with corresponding finger-like portions or projections $b'$ of the driven member $b$ and the inter-secting non-concentric grooves $a^3$ and $b^3$ in the proximate faces of the co-acting portions $a'$ and $b'$ are inclined inwardly, from their closed ends to their open ends, toward the axis of the joint, each relatively movable body or ball $f$ lying partly in the corresponding groove $a^3$ and partly in the corresponding groove $b^3$, as in the construction shown in said Letters Patent. In the present construction, however, each groove $a^3$ and $b^3$ is cut through the corresponding co-acting portion $a'$ and $b'$ toward the axis of the joint so that the ball may protrude through the open side thereof and have a bearing against a circular abutment which, in this instance, is disposed within the orbit of the balls. In the construction shown in Figures 1 and 2, the circular abutment is formed by a grooved two-part sphere $d$, $d'$, the two parts being each slightly less than a half sphere and being held yieldingly together by a screw $d^2$ with a spring $d^3$ interposed between the head of the screw and the recess formed to receive it, this construction providing for easy adjustment and for the taking up of wear. In this construction the driving member $a$ is formed as a sleeve pinned on the driving shaft $c$ and the driven member $b$ is likewise formed as a sleeve which is pinned on the driven shaft $c'$. The proximate ends of the two shafts are formed with spherical seats, as at $c^2$, to receive the spherical bearing $d$, $d'$ against which they bear in the angular displacement of the two members. In assembling the joint of this form the two members of the joint are brought together with the balls $f$ in place in the grooves $a^3$, $b^3$ with the member $d$ of the circular abutment also in place and with the member $a$ of the joint not yet pinned on the shaft $c$ as shown but free to move. Then, the balls $f$ being pressed outwardly, the member $d'$ of the spherical bearing is placed in position, together with the spring and screw, the latter being turned up to give the desired pressure, and the member $b$ of the joint is pinned on the driven shaft $c'$. It will be noted that the internal diameter of the sleeve member $b$ is such as to permit the introduction therethrough of the member $d'$ of the spherical bearing. It will now be understood that any relative movement of the two members of the joint which tends to separate them will tend also, through the inward inclination of the grooves $a^3$, $b^3$, to move both diametrically opposed balls in the same direction and that as relative movement of the balls toward each other is resisted by the circular abutment formed by the sphere $d$, $d'$, the balls themselves will resist and prevent any separating movement of the two members of the joint by reason of the coaction of the non-concentric grooves with the balls.

Figure 3:
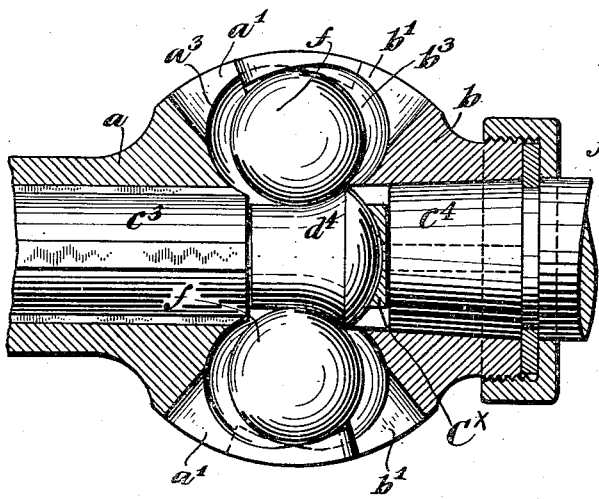
Figures 3 and 4 are views respectively similar to Figures 1 and 2, but showing a different form of the circular abutment within the orbit of the balls.
Figure 4:
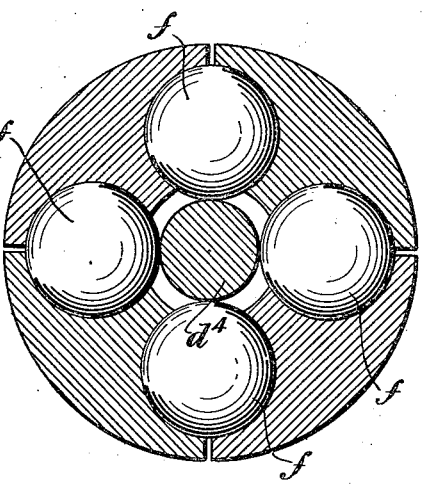

In the embodiment of the invention shown in Figures 3 and 4, the two members $a$ and $b$ are formed with co-acting portions $a'$, $b'$, and with inwardly inclined intersecting grooves $a^3$, $b^3$ in proximate faces thereof. The member $a$ is shown as keyed on the driving shaft $c^3$ and the member $b$ as having a tapered fit on the driven shaft $c^4$. At the end of the driving shaft $c^3$, but independent thereof, is placed a concavely conical member $d^4$, to form the internal, circular abutment for the balls $f$ which bear thereon and are thereby held from movement toward each other and so prevent the separation of the members of the joint by reason of the coaction of the non-concentric grooves with the balls. The member $d^4$ bears at one end against the end of the shaft $c^3$ and at the other end has a conical head which is received in a conical seat formed in a member $c^x$, which bears against the end of the shaft $c^4$ and is movable transversely to a limited extent, having a diameter less than the internal diameter of the member $b$ at that point. In assembling this construction, the member $a$ of the joint may be secured to the driving shaft $c^3$ and the two members $a$ and $b$ may then be placed in operative relation. The balls $f$ may then be introduced through the bore of the member $b$ and pressed into the grooves $a^3$, $b^3$, and thereafter the tapered and reduced member $d^5$ and spherical seat $c^x$ may be introduced in the bore of the member $b$, the member $d^4$ holding the balls in their places and forming a circular abutment to prevent radial movement of the balls, in this case toward the axis of the joint, the coaction of the non-concentric grooves with the balls, which are thus held from displacement toward each other, preventing any separating movement of the two members of the joint.

In the embodiment of the invention shown in Figures 5 and 6, the members $a^5$ and $b^5$ of the joint are formed as before, with co-acting portions $a'$ and $b'$ (in this case with four such portions each) and the grooves $a^3$ and $b^3$ are inclined outwardly, away from the axis of the bearing, and are cut away on the outside so as to permit the balls $f$ to protrude externally. In this instance, therefore, it is necessary to provide an external circular abutment to prevent radial movement of the balls outwardly. This is formed, in this instance, of a two-part raceway $g$, split circumferentially and suitably grooved internally for co-action with the balls $f$, and a suitable housing $h$ to hold the two parts of the raceway together. In this construction the extremity of the driven shaft $c^6$ is shown as threaded, as at $d^6$, to receive a sleeve $d^7$, on which is mounted an annular, spherical bearing member $d^8$, concentric with the center of the joint, on which the members $a^5$ and $b^5$ of the joint may bear. In assembling this construction the two members of the bearing are brought into operative relation, the balls $f$ are placed in the grooves, the split raceway $g$ is applied, and the housing $h$ is sprung or bent over the two-part raceway to hold the two parts in operative relation. The external abutment formed by the raceway $g$ prevents displacement of the diametrically opposite balls from each other and the coaction of the inner walls of the concentric grooves with the balls thus held from relative displacement, prevents separation of the two members.

It will be obvious that various changes in details of construction and arrangement may be made to suit different conditions of use and that the invention, except as pointed out in the claims, is not limited to any of the particular constructions shown and described herein.

I claim as my invention:

1. A universal joint having two members capable of relative angular displacement and having co-acting portions with their proximate faces formed with non-concentric grooves, two diametrically opposed movable bodies received partly in each of such grooves and through which force is transmitted from one co-acting portion to the other, and a circular abutment forming a bearing for said movable bodies to prevent relative displacement thereof in a radial plane.

2. A universal joint having two members capable of relative angular displacement and having co-acting portions with their proximate faces formed with non-concentric grooves with their longitudinal axes intersecting at an angle, two diametrically opposed movable bodies received partly in each of such grooves and through which force is transmitted from one co-acting portion to the other, and means to prevent relative displacement of such movable bodies in a radial plane.

3. A universal joint having two members capable of relative angular displacement and having co-acting portions with their proximate faces formed with non-concentric grooves with their longitudinal axes intersecting at an angle, two diametrically opposed movable bodies received partly in each of such grooves and through which force is transmitted from one co-acting portion to the other, and a circular abutment forming a bearing for said movable bodies to prevent relative displacement thereof in a radial plane.

This specification signed this 14" day of February, A. D., 1927.

CARL W. WEISS.